United States Patent
Ushijima (10) Patent No.: US 10,408,145 B2
(45) Date of Patent: Sep. 10, 2019

(54) EGR CONTROL DEVICE

(71) Applicant: SUBARU CORPORATION, Tokyo (JP)

(72) Inventor: Hirooki Ushijima, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/009,420

(22) Filed: Jun. 15, 2018

(65) Prior Publication Data

US 2019/0093576 A1 Mar. 28, 2019

(30) Foreign Application Priority Data

Sep. 26, 2017 (JP) .................................. 2017-184886

(51) Int. Cl.
*F02D 41/00* (2006.01)
*F02M 26/47* (2016.01)
*F02D 41/14* (2006.01)

(52) U.S. Cl.
CPC ..... *F02D 41/0077* (2013.01); *F02D 41/0065* (2013.01); *F02D 41/1401* (2013.01);
(Continued)

(58) Field of Classification Search
CPC ............ F02D 41/0077; F02D 41/1401; F02D 41/144; F02D 41/0065; F02D 2200/0414;
(Continued)

(56) References Cited

U.S. PATENT DOCUMENTS 6,079,387 A * 6/2000 Mamiya ................. F02D 33/00
123/295
6,401,457 B1 * 6/2002 Wang ..................... F02B 37/18
123/568.21
(Continued)

FOREIGN PATENT DOCUMENTS

JP     2008-267335 A    11/2008
JP     2014-47718 A      3/2014
(Continued)

OTHER PUBLICATIONS

Japanese Decision to Grant Patent for Application No. 2017-184886 dated Jan. 29, 2019.

*Primary Examiner* — Joseph J Dallo
(74) *Attorney, Agent, or Firm* — Troutman Sanders LLP (57) ABSTRACT

An EGR control device includes: a drive unit, a basic opening degree deriving unit, a measurement unit, a memory unit, a correction opening degree deriving unit and a control unit. The drive unit varies an opening degree of an EGR valve. The basic opening degree deriving unit derives a basic EGR valve opening degree based on an operating condition of an engine. The measurement unit measures a temperature in the downstream side of a position of where EGR gas is recirculated in an intake passage. In the memory unit, information acquired in advance is stored. The information indicates a relationship between the opening degree and a temperature difference. The correction opening degree deriving unit derives a correction opening degree with reference to the information. The control unit controls the drive unit such that the opening degree of the EGR valve becomes a target EGR valve opening degree by correcting the basic EGR valve opening degree with the correction opening degree.

6 Claims, 3 Drawing Sheets

(52) U.S. Cl.
CPC ........... *F02D 41/144* (2013.01); *F02M 26/47* (2016.02); *F02D 2041/007* (2013.01); *F02D 2041/0067* (2013.01); *F02D 2200/0414* (2013.01)

(58) Field of Classification Search
CPC ...... F02D 2041/007; F02D 2041/0067; F02M 26/47
See application file for complete search history.

(56) References Cited

U.S. PATENT DOCUMENTS

| | | | | |
|---|---|---|---|---|
| 10,260,436 | B2 * | 4/2019 | Surnilla | F02D 41/0077 |
| 2004/0122584 | A1 * | 6/2004 | Muto | F02D 41/0072 |
| | | | | 701/108 |
| 2005/0228573 | A1 * | 10/2005 | Gangopadhyay | F02D 41/0052 |
| | | | | 701/108 |
| 2007/0246028 | A1 * | 10/2007 | Fujita | F02D 41/0052 |
| | | | | 123/568.12 |
| 2010/0179745 | A1 * | 7/2010 | Nakayama | F02D 41/0072 |
| | | | | 701/108 |
| 2011/0023847 | A1 * | 2/2011 | Gates | F02D 41/0072 |
| | | | | 123/568.21 |
| 2012/0144806 | A1 * | 6/2012 | Hamamatsu | F02D 41/0052 |
| | | | | 60/278 |
| 2014/0014079 | A1 * | 1/2014 | Yacoub | F02D 41/144 |
| | | | | 123/568.16 |
| 2014/0290239 | A1 * | 10/2014 | Akita | F02D 41/0077 |
| | | | | 60/602 |
| 2015/0219029 | A1 * | 8/2015 | Nakashima | F02D 41/0072 |
| | | | | 123/703 |
| 2016/0230683 | A1 * | 8/2016 | Surnilla | F02D 41/0072 |
| 2016/0230684 | A1 * | 8/2016 | Surnilla | F02D 41/0077 |
| 2016/0326974 | A1 * | 11/2016 | Lahti | F02D 41/0072 |
| 2017/0089279 | A1 * | 3/2017 | Yoeda | F02M 26/47 |
| 2017/0152806 | A1 * | 6/2017 | Mischler | F02D 41/0002 |

FOREIGN PATENT DOCUMENTS

| | | |
|---|---|---|
| JP | 2016-113959 A | 6/2016 |
| JP | 2016-113960 A | 6/2016 |

* cited by examiner

EGR CONTROL DEVICE

CROSS-REFERENCE TO RELATED APPLICATIONS

The present application claims priority from Japanese Patent Application No. 2017-184886 filed on Sep. 26, 2017, the entire contents of which are hereby incorporated by reference.

BACKGROUND

1. Technical Field

The present invention relates to an exhaust gas recirculation (EGR) control device.

2. Related Art

Japanese Unexamined Patent Application Publication (JP-A) No. 2014-47718 discloses an EGR control device that calculates a target EGR valve opening degree obtained by adding a correction amount to a basic EGR valve opening degree of an EGR valve so as to increase an accuracy of an amount of EGR gas introduced into an intake passage. In JP-A No. 2014-47718, a plurality of types of sensors are disposed in the EGR passage, and the target EGR valve opening degree of the EGR valve is calculated based on information acquired from each sensor. Here, the plurality of types of sensors include an EGR pressure sensor for measuring a pressure in the EGR passage, an EGR temperature sensor for measuring a temperature in the EGR passage, and the like.

SUMMARY OF THE INVENTION

An aspect of the present invention provides an EGR control device. The EGR control device includes a drive unit configured to vary an opening degree of an EGR valve, a basic opening degree deriving unit configured to derive a basic EGR valve opening degree of the EGR valve on a basis of an operating condition of an engine, a measurement unit configured to measure a temperature in the downstream side of a position where an EGR gas is recirculated in an intake passage, a memory unit in which information acquired in advance is stored, the information indicating a relationship between the opening degree of the EGR valve and a temperature difference between a temperature when the EGR valve is set to the opening degree and a temperature when the EGR valve is set to a reference opening degree, a correction opening degree deriving unit configured to derive a correction opening degree of the EGR valve with reference to the information, based on the temperature difference between the temperature when the EGR valve is set to the reference opening degree and the temperature when the EGR valve is set to the basic EGR valve opening degree, and a control unit configured to control the drive unit such that the opening degree of the EGR valve becomes a target EGR valve opening degree obtained by correcting the basic EGR valve opening degree with the correction opening degree.

DETAILED DESCRIPTION

A preferred example of the present invention will be described in detail with reference to accompanying drawings. Dimensions, materials, specific numerical values, and the like illustrated in such examples are merely instances for facilitating understanding of the invention, and do not limit the present invention unless otherwise noted. Further, elements in the following example which are not recited in a most-generic independent claim of the disclosure are optional and may be provided on an as-needed basis. The drawings are schematic and are not intended to be drawn to scale. In the present specification and the drawings, elements having substantially the same function and configuration are denoted by the same reference signs and numerals, and redundant explanations are omitted, and elements not directly related to the present invention are omitted.

In the method described in JP-A No. 2014-47718, there is a problem that a plurality of types of sensors are required to be provided around the EGR passage in order to calculate the target EGR valve opening degree of the EGR valve, and as a result, a configuration of the EGR control device becomes complicated.

It is desirable to accurately control an amount of EGR gas introduced into an intake passage with a simple configuration.

Figure 1:
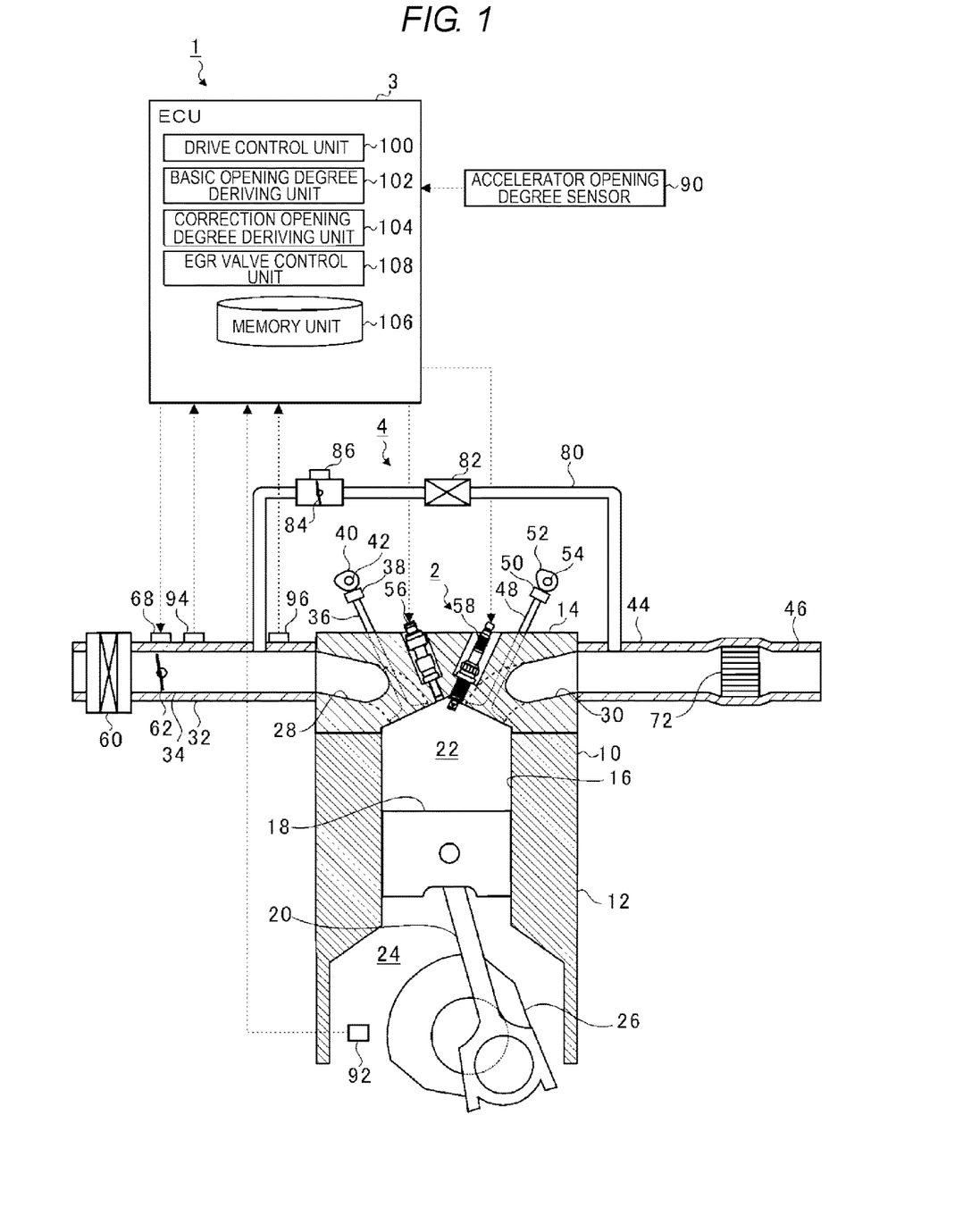
FIG. 1 is a schematic diagram illustrating a configuration of an EGR control device.

FIG. 1 is a schematic diagram illustrating a configuration of an EGR control device 1. The configuration and processing related to the example will be described in detail below, but the description of the configuration and processing unrelated to the example will be omitted.

As illustrated in FIG. 1, the EGR control device 1 is provided with an engine 2 and an engine control unit (ECU) 3, and the entire engine 2 is driven and controlled by the ECU 3.

The engine 2 is provided with a cylinder block 10, a crankcase 12 permanently affixed to the cylinder block 10, and a cylinder head 14 connected with the cylinder block 10.

A plurality of cylinders 16 are formed in the cylinder block 10, and a piston 18 is slidably supported by a connecting rod 20 in the cylinder 16. A space surrounded by the cylinder head 14, the cylinder 16, and a crown surface of the piston 18 is formed as a combustion chamber 22.

A crank chamber 24 is formed by a crankcase 12 in the engine 2. In the crank chamber 24, a crankshaft 26 is rotatably supported. The piston 18 is connected to the crankshaft 26 through the connecting rod 20.

An intake port 28 and an exhaust port 30 are formed in the cylinder head 14 so as to communicate with the combustion chamber 22.

An intake passage 34 including an intake manifold 32 is coupled to the intake port 28. The intake port 28 has one opening that is formed in the upstream side with regard to the flow of intake air, and that faces the intake manifold 32. In addition, the intake port 28 has two openings that are formed in the downstream side with regard to the flow of intake air and that face the combustion chamber 22. Accordingly, the flow passage of the intake port 28 is branched into two on the way from upstream to downstream.

A tip of an intake valve 36 is positioned between the intake port 28 and the combustion chamber 22. A cam 42 fixed to an intake camshaft 40 abuts against an end of the intake valve 36 through a rocker arm 38. As the intake camshaft 40 rotates, the intake valve 36 opens and closes the intake port 28 with respect to the combustion chamber 22.

An exhaust passage 46 including an exhaust manifold 44 is coupled to the exhaust port 30. The exhaust port 30 has two openings that are formed in the upstream side with regard to the flow of exhaust, and that faces the combustion chamber 22. In addition, the exhaust port 30 has one opening that is formed in the downstream side with regard to the flow of exhaust and that faces the exhaust manifold 44. As a result, the flow passages of the exhaust port 30 are integrated into one on the way from upstream to downstream.

A tip of an exhaust valve 48 is positioned between the exhaust port 30 and the combustion chamber 22. A cam 54 fixed to an exhaust camshaft 52 abuts against an end of the exhaust valve 48 via a rocker arm 50. As the exhaust camshaft 52 rotates, the exhaust valve 48 opens and closes the exhaust port 30 with respect to the combustion chamber 22.

In the cylinder head 14, an injector 56 and an ignition plug 58 are provided so that tips thereof are located in the combustion chamber 22. The injector 56 injects fuel toward the air that has flowed into the combustion chamber 22 through the intake port 28. The ignition plug 58 ignites a mixture of air and fuel at a predetermined timing to combust the air-fuel mixture. By such combustion, the piston 18 reciprocates in the cylinder 16. The reciprocation of the piston 18 allows the crankshaft 26 to rotate through the connecting rod 20.

In the intake passage 34, an air cleaner 60 and a throttle valve 62 are provided in order from the upstream side. The air cleaner 60 removes foreign matter mixed in air sucked from the outside air. The throttle valve 62 is driven to be opened and closed by an actuator 68 depending on an opening degree of an accelerator (not illustrated), and adjusts an air amount to be sent to the combustion chamber 22.

A catalyst 72 is provided in the exhaust passage 46. The catalyst 72 is, for instance, a three-way catalyst, which removes hydrocarbon (HC), carbon monoxide (CO), and nitrogen oxide ($NO_x$) in exhaust gas discharged from the combustion chamber 22.

Further, an EGR device 4 for recirculating part of the exhaust gas from the exhaust passage 46 to the intake passage 34 through an exhaust gas recirculation passage 80 is provided in the engine 2. The EGR device 4 includes an exhaust gas recirculation passage 80 that communicates the intake passage 34 and the exhaust passage 46 with each other, and causes part of the exhaust gas flowing through the exhaust flow passage 46 to be recirculated to the intake passage 34.

An EGR cooler 82 for lowering the temperature of the exhaust gas and an EGR valve 84 for controlling the flow rate of the exhaust gas flowing through the exhaust gas recirculation passage 80 are provided in the exhaust gas recirculation passage 80. The EGR valve 84 is, for instance, a butterfly valve, and an opening degree thereof is varied by a stepping motor 86. In one example, the stepping motor 86 may serve as a "drive unit". In the following description, the exhaust gas flowing through the exhaust gas recirculation passage 80 is also referred to as EGR gas.

Further, an accelerator opening degree sensor 90, a crank angle sensor 92, a flow meter 94, and an intake air temperature sensor 96 are provided in the EGR control device 1. In one example, the intake air temperature sensor 96 (measurement unit) may serve as a "measurement unit". The accelerator opening degree sensor 90 measures the depression amount of the accelerator pedal. The crank angle sensor 92 is provided in the vicinity of the crankshaft 26, and outputs a pulse signal each time the crankshaft 26 rotates by a predetermined angle. The flow meter 94 is provided downstream of the throttle valve 62 in the intake passage 34, and measures the intake air amount that passes through the throttle valve 62 to be supplied to the combustion chamber 22. The intake air temperature sensor 96 is provided in the intake manifold 32 disposed in the downstream side of the throttle valve 62 in the intake passage 34, and measures the temperature (intake air temperature) inside the intake passage 34 (inside the intake manifold 32). Specifically, the intake air temperature sensor 96 measures the temperature in the downstream side of the position of a portion where the EGR gas is recirculated in the intake passage 34 (intake manifold 32). That is, the intake air temperature sensor 96 measures the temperature of the intake air mixed with the EGR gas.

The ECU 3 is a microcomputer including a central processing unit (CPU), a read-only memory (ROM) in which programs and the like are stored, a random access memory (RAM) as a work area, and the like, and totally controls the engine 2 and the EGR device 4. According to the present example, when controlling the engine 2 and the EGR device 4, the ECU 3 functions as a drive control unit 100, a basic opening degree deriving unit 102, a correction opening degree deriving unit 104, a memory unit 106, and an EGR valve control unit 108 (controller).

The drive control unit 100 derives the current engine speed based on the pulse signal detected by the crank angle sensor 92. Then, the drive control unit 100 refers to the rotational speed torque map stored in the ROM in advance to derive the target torque and the target engine speed, based on the derived engine speed and the accelerator opening degree (engine load) measured by the accelerator opening degree sensor 90. In the rotational speed torque map, for instance, the relationship between the four factors, that is, the engine speed, the accelerator opening degree, and the target torque and the target engine speed is defined.

Further, the drive control unit 100 determines the target air amount to be supplied to each cylinder 16 based on the derived target engine speed and the target torque, and determines the target throttle valve opening degree based on the determined target air amount.

Then, the drive control unit 100 drives the actuator 68 so that the throttle valve 62 is opened by the determined target throttle valve opening degree.

Further, for instance, the drive control unit 100 determines that the fuel amount which complies with the theoretical air-fuel ratio ($\lambda=1$) is the target injection amount, based on the determined target air amount, and determines the target injection timing and the target injection period of the injector 56 so as to inject, from the injector 56, the determined target injection amount of fuel. Then, the drive control unit 100 drives the injector 56 at the determined target injection timing and during target injection period to inject the target injection amount of fuel from the injector 56.

Further, the drive control unit 100 determines the target ignition timing of the ignition plug 58 based on the derived target engine speed and the pulse signal detected by the crank angle sensor 92. Then, the drive control unit 100 allows the ignition plug 58 to ignite at the determined target ignition timing.

The basic opening degree deriving unit 102 derives the target EGR rate indicating the ratio of the EGR gas to the total amount of the intake air and the EGR gas introduced into the combustion chamber 22 by referring to an EGR rate map stored in the ROM in advance, based on the engine speed and the engine load (the engine speed and the engine load are collectively referred to as operating conditions). In the EGR rate map, for instance, the relationship between the three factors, that is, the engine speed, the engine load, and the target EGR rate is defined.

Subsequently, the basic opening degree deriving unit 102 derives a target EGR flow rate to be recirculated to the intake passage 34, based on the derived target EGR rate and the intake air amount measured by the flow meter 94. Then, the basic opening degree deriving unit 102 derives the opening degree of the EGR valve 84 for recirculating the EGR gas of the target EGR flow rate to the intake passage 34 as the basic EGR valve opening degree. The basic opening degree deriving unit 102 derives the basic EGR valve opening degree with reference to the EGR opening degree map stored in the ROM in advance, based on the target EGR flow rate. In the EGR opening degree map, for instance, the relationship between the two factors, that is, the target EGR flow rate and the basic EGR valve opening degree is defined.

However, the basic EGR valve opening degree may not be derived based on the target EGR flow rate. For instance, the basic EGR valve opening degree may be directly derived using, for instance, a rotational load opening degree map stored in the ROM in advance. In the rotational load opening degree map, for instance, the relationship between the three factors, that is, the engine speed, the engine load, and the basic EGR valve opening degree is defined. In this manner, the basic opening degree deriving unit 102 derives the basic EGR valve opening degree of the EGR valve 84 based on the operating conditions of the engine 2.

When the basic EGR valve opening degree is derived by the basic opening degree deriving unit 102, the EGR valve control unit 108 controls the opening degree of the EGR valve 84 to the basic EGR valve opening degree.

Here, assuming that nothing adheres to the EGR valve 84, the basic EGR valve opening degree is set to a value obtained when the EGR gas is recirculated at the target EGR flow rate at the time of opening the EGR valve 84 by the basic EGR valve opening degree. However, various materials (deposits) contained in the EGR gas adhere to the EGR valve 84 or the periphery of the EGR valve 84. Then, in a case where the deposits adhere, even if the EGR valve 84 is opened by the basic EGR valve opening degree, the opening area of the EGR valve 84 decreases due to adhesion of deposits, and the flow rate of the EGR gas decreases below the target EGR flow rate.

Therefore, considering adhesion of the deposits, the basic EGR valve opening degree is corrected and a new target EGR valve opening degree is derived, such that the flow rate of the EGR gas approaches the target EGR flow rate. However, in a case where a plurality of types of sensors are provided around the exhaust gas recirculation passage 80 in order to derive a new target EGR valve opening degree, the configuration of the EGR control device 1 becomes complicated and the cost also increases. For instance, in a case where an EGR pressure sensor for measuring the pressure in the exhaust gas recirculation passage 80 and an EGR temperature sensor for measuring the temperature in the exhaust gas recirculation passage 80 are provided around the exhaust gas recirculation passage 80, the configuration of the EGR control device 1 becomes complicated, and the cost also increases.

Therefore, according to the present example, the correction opening degree (correction amount), which is the correction of the basic EGR valve opening degree, is estimated based on the intake air temperature measured by the intake air temperature sensor 96, without disposing the EGR pressure sensor and the EGR temperature sensor around the exhaust gas recirculation passage 80. As described above, the correction amount of the basic EGR valve opening degree is estimated based on the intake air temperature without disposing the EGR pressure sensor and the EGR temperature sensor, which can lead to simplification of the configuration and reduction of the cost.

The correction opening degree deriving unit 104 derives (estimates) the correction opening degree (correction amount), which is the correction of the basic EGR valve opening degree. The correction opening degree deriving unit 104 acquires the intake air temperature from the intake air temperature sensor 96 at different timings, before deriving the correction opening degree. The correction opening degree deriving unit 104 acquires the intake air temperature (hereinafter referred to as a first intake air temperature) when the opening degree of the EGR valve 84 is controlled to 0% (reference opening degree) by the EGR valve control unit 108 (for instance, when the EGR gas is not flowing, such as during idling).

Then, the correction opening degree deriving unit 104 acquires the intake air temperature (hereinafter referred to as a second intake air temperature) when the opening degree of the EGR valve 84 is controlled to the basic EGR valve opening degree by the EGR valve control unit 108. Then, the correction opening degree deriving unit 104 derives the correction opening degree based on the acquired intake air temperatures. A specific method of deriving the correction opening degree will be described later.

Temperature difference information (temperature difference information map) indicating the relationship between the opening degree (EGR opening degree) of the EGR valve 84 obtained in advance by experiment and the temperature difference ($\Delta T$) of the intake air temperature is stored in the memory unit 106. In the temperature difference information map, for instance, the relationship between the two factors, that is, the EGR opening degree and the temperature difference of the intake air temperature is defined. Specifically, the temperature difference information indicates a relationship between the opening degree of the EGR valve 84 and the temperature difference between the intake air temperature when the EGR valve 84 is set to the opening degree and the intake air temperature when the EGR valve 84 is set to the reference opening degree. Here, the temperature difference information stored in the memory unit 106 is information obtained by an experiment using a new EGR valve 84 (hereinafter referred to as a new valve) to which a deposit has not yet adhered. Therefore, the memory unit 106 stores the temperature difference information indicating a relationship of the temperature difference between the intake air temperature when the new valve is set to the opening degree and the intake air temperature when the new valve is set to the reference opening degree (that is, 0%), in association with the opening degree of the new valve.

Figure 2:
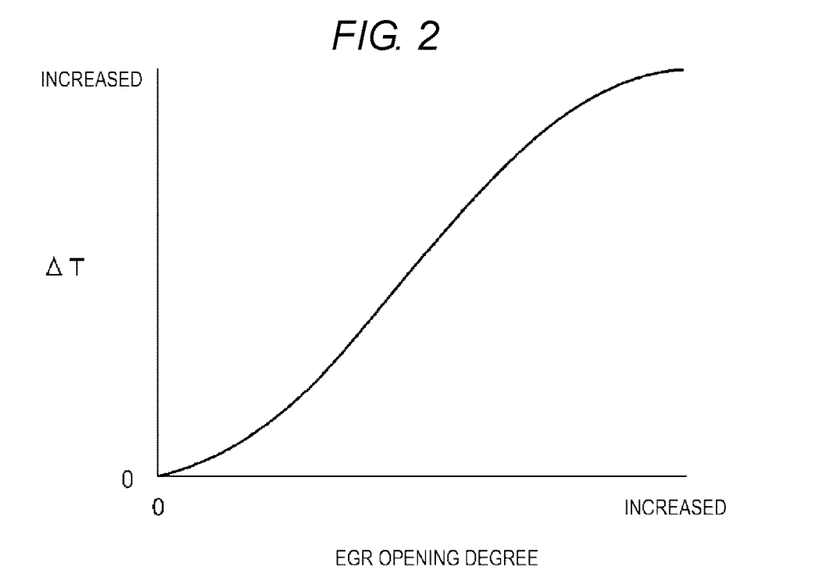
FIG. 2 is a graph representing a temperature difference information map stored in a memory unit.

FIG. 2 is a graph representing the temperature difference information map stored in the memory unit 106. The horizontal axis in FIG. 2 represents the EGR opening degree which is the opening degree of the EGR valve 84 (new valve). The vertical axis in FIG. 2 represents $\Delta T$ which is the temperature difference between the intake air temperature when the new valve is set to the opening degree on the horizontal axis and the intake air temperature when the new valve is set to the reference opening degree. As can be seen from FIG. 2, the value of ΔT varies with the magnitude of the EGR opening degree. For instance, the value of ΔT increases as the EGR opening degree increases (that is, approaches 100%). Also, the value of ΔT decreases as the EGR opening degree decreases (that is, approaches 0%).

As described above, when deposits adhere to the EGR valve 84, the opening area of the EGR valve 84 decreases. Therefore, the opening area when the EGR valve 84 (hereinafter referred to as a contamination valve) to which the deposits adhere is set to a predetermined opening degree is smaller than the opening area when the new valve is set to the same opening degree as the contamination valve. As can be clearly seen from FIG. 2, the value of ΔT decreases as the EGR opening degree (that is, the opening area) decreases. Here, the difference between the intake air temperature when the contamination valve is set to the predetermined opening degree and the intake air temperature when the contamination valve is set to the reference opening degree (0%) is defined as ΔT (first temperature difference). Further, the difference between the intake air temperature when the new valve is set to the predetermined opening degree (the same opening degree as the contamination valve) and the intake air temperature when the new valve is set to the reference opening degree (the same opening degree as the contamination valve) is defined as ΔT (second temperature difference). In this case, as illustrated in FIG. 2, since the value of ΔT becomes smaller as the opening area becomes smaller, when comparing the first temperature difference and the second temperature difference which are derived when the contamination valve and the new valve are set to the same opening degree, the first temperature difference is smaller than the second temperature difference.

Figure 3:
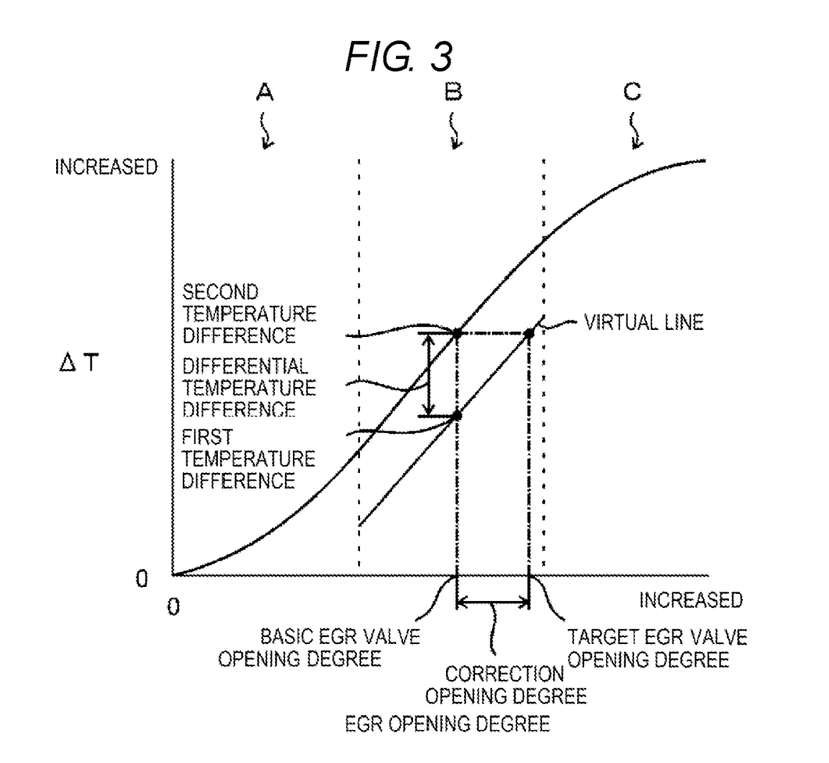
FIG. 3 is a diagram illustrating a method of deriving a correction opening degree which is the correction of a basic EGR valve opening degree from a difference (differential temperature difference) between a first temperature difference and a second temperature difference.

The correction opening degree deriving unit 104 derives (estimates) the correction opening degree which is the correction of the basic EGR valve opening degree, based on the difference (differential temperature difference) between the first temperature difference and the second temperature difference. FIG. 3 is a diagram illustrating a method of deriving a correction opening degree which is the correction of the basic EGR valve opening degree from a difference (differential temperature difference) between the first temperature difference and the second temperature difference. Hereinafter, a method of deriving the correction opening degree which is the correction of the basic EGR valve opening degree from the difference (differential temperature difference) between the first temperature difference and the second temperature difference will be described with reference to FIG. 3.

The correction opening degree deriving unit 104 first derives the temperature difference (first temperature difference) which is a difference between the first intake air temperature and the second intake air temperature, based on the first intake air temperature and the second intake air temperature acquired from the intake air temperature sensor 96 prior to the derivation of the correction opening degree.

Here, as illustrated in FIG. 3, the region of the EGR opening degree (for instance, 0% to 100%) is divided into a plurality of predetermined regions (for instance, three regions A to C). In the memory unit 106, slope information indicating the slope of the temperature difference (ΔT) with respect to the EGR opening degree of the new valve in each region (for instance, the average change rate in each region) is stored. The correction opening degree deriving unit 104 specifies a region including a basic EGR valve opening degree (for instance, 30%) among a plurality of regions, from the slope information stored in the memory unit 106. Further, the correction opening degree deriving unit 104 acquires the slope of the region including the basic EGR valve opening degree, from the slope information stored in the memory unit 106.

In the instance illustrated in FIG. 3, the basic EGR valve opening degree is included in the region B. Therefore, the correction opening degree deriving unit 104 specifies the region B including the basic EGR valve opening degree in the regions A to C. Further, the correction opening degree deriving unit 104 acquires the slope in the specified region B from the slope information stored in the memory unit 106. Then, the correction opening degree deriving unit 104 derives a virtual line having the acquired slope through the current value of ΔT (first temperature difference) in the basic EGR valve opening degree (30%, as described above). Although, the virtual line is assumed to be a straight line having a predetermined slope, the virtual line is not limited thereto, and may be a curve (function). For instance, the virtual line may be an approximate curve of the temperature difference (ΔT) with respect to the EGR opening degree illustrated in FIG. 2.

The correction opening degree deriving unit 104 acquires a value of ΔT (second temperature difference) in the basic EGR valve opening degree of the new valve (30%, as described above), from the temperature difference information stored in the memory unit 106. Then, a difference (differential temperature difference) between the value of the current ΔT (first temperature difference) and the value of ΔT (second temperature difference) acquired from the temperature difference information stored in the memory unit 106 is derived.

The correction opening degree deriving unit 104 derives the correction opening degree which is the correction of the basic EGR valve opening degree based on the derived virtual line and the differential temperature difference. Specifically, the correction opening degree deriving unit 104 derives, as a correction opening degree, the difference between the EGR opening degree corresponding to the value of the current ΔT (first temperature difference) in the virtual line and the EGR opening degree corresponding to the value of the ΔT (second temperature difference) acquired from the memory unit 106 in the virtual line.

The EGR valve control unit 108 corrects (adds) the basic EGR valve opening degree derived by the basic opening degree deriving unit 102 by the correction opening degree derived by the correction opening degree deriving unit 104, and as a result, the final EGR opening degree (target EGR valve opening degree) is derived. Then, the EGR valve control unit 108 drives the stepping motor 86 to open the EGR valve 84 by the target EGR valve opening degree. That is, the EGR valve control unit 108 controls the stepping motor 86 such that the EGR opening degree becomes the target EGR valve opening degree obtained by correcting the basic EGR valve opening degree with the correction opening degree.

The correction opening degree deriving unit 104 stores the basic EGR valve opening degree derived by the basic opening degree deriving unit 102 and the correction opening degree derived by the correction opening degree deriving unit 104 in the memory unit 106, with the basic EGR valve opening degree and the correction opening degree being correlated with each other, as the correction opening degree information (data). The correction opening degree deriving unit 104 stores the correction opening degree information in the memory unit 106 each time the correction opening degree is derived. Further, when storing new correction opening degree information in the memory unit 106, in a case where an existing correction opening degree information is already present in the memory unit 106, the correction opening degree deriving unit 104 maps and stores the correction opening degree information (data mapping). Here, the correction opening degree information may be stored separately for each of a plurality of regions. The data mapping is updated every predetermined driving cycle or traveling distance determined in advance.

In a case where the correction opening degree information is stored in the memory unit 106, the correction opening degree deriving unit 104 may derive the correction opening degree from the correction opening degree information stored in the memory unit 106. Further, the correction opening degree deriving unit 104 may interpolate (for instance, linearly interpolates) the plurality of correction opening degree information stored in the memory unit 106 and derive the correction opening degree corresponding to the basic EGR valve opening degree. In this case, the correction opening degree deriving unit 104 can derive the correction opening degree without deriving the differential temperature difference and the virtual line described above.

Figure 4:
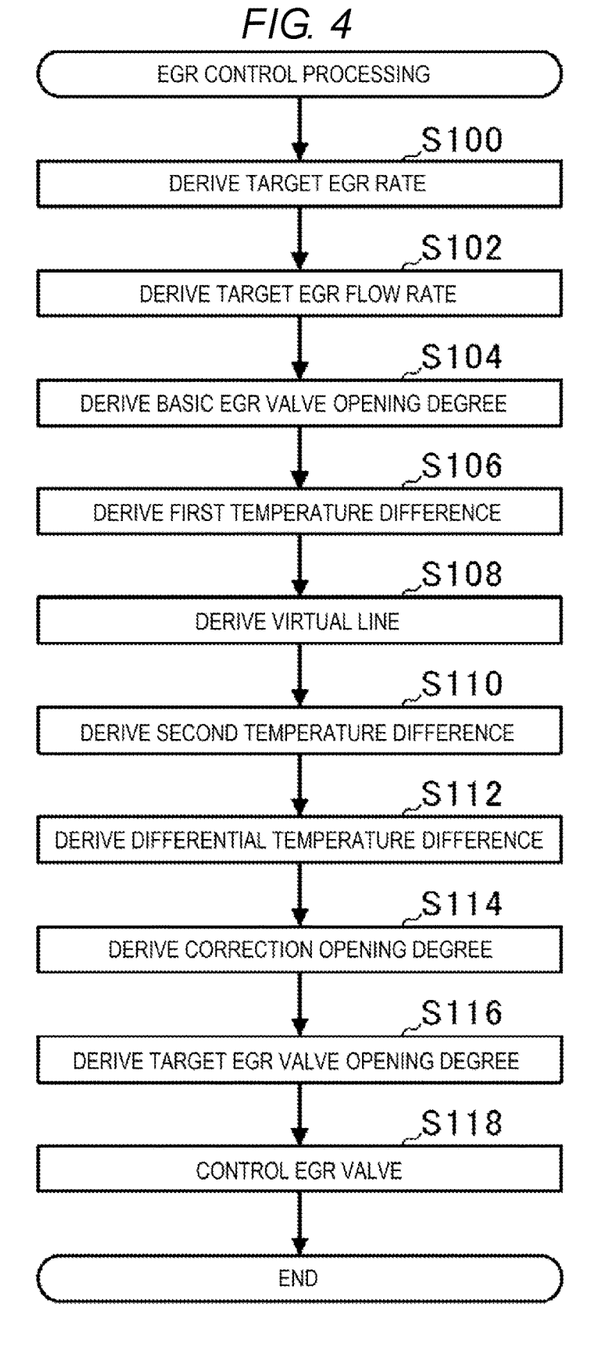
FIG. 4 is a flowchart illustrating an EGR control processing.

FIG. 4 is a flowchart illustrating an EGR control processing. When controlling the EGR valve 84, the ECU 3 executes the EGR control processing illustrated in FIG. 4. First, the basic opening degree deriving unit 102 derives a target EGR rate based on the engine speed and the engine load (S100).

Subsequently, the basic opening degree deriving unit 102 derives a target EGR flow rate based on the derived target EGR rate and the intake air amount measured by the flow meter 94 (S102). Then, the basic opening degree deriving unit 102 derives, as the basic EGR valve opening degree, the opening degree of the EGR valve 84 for recirculating the EGR gas of the target EGR flow rate to the intake passage 34 (S104).

The correction opening degree deriving unit 104 derives a temperature difference (first temperature difference) which is a difference between the first intake air temperature when the opening degree of the EGR valve 84 is set to the reference opening degree and the second intake air temperature when the opening degree of the EGR valve 84 is set to the basic EGR valve opening degree that has been derived in step S104 (S106).

Subsequently, the correction opening degree deriving unit 104 specifies a region including the basic EGR valve opening degree among the plurality of divided regions, from the slope information stored in the memory unit 106. Further, the correction opening degree deriving unit 104 acquires the slope of the region including the basic EGR valve opening degree, from the slope information stored in the memory unit 106. Further, a virtual line having a slope in the specified region is derived through the value of the first temperature difference at the basic EGR valve opening degree (S108).

Then, the correction opening degree deriving unit 104 acquires a value of ΔT (second temperature difference) in the basic EGR valve opening degree of a new valve from the temperature difference information stored in the memory unit 106 (S110). Then, a difference (differential temperature difference) between the first temperature difference and the second temperature difference is derived (S112). Further, a correction opening degree is derived based on the virtual line derived in step S108 and the differential temperature difference derived in step S112 (S114).

Then, the EGR valve control unit 108 corrects (adds) the basic EGR valve opening degree derived in S104 by the correction opening degree derived in S114 to thereby derive the final EGR opening degree (target EGR valve opening degree) (S116). Then, the EGR valve control unit 108 drives the stepping motor 86 to open the EGR valve 84 by the target EGR valve opening degree (S118).

As described above, the EGR control device 1 estimates the correction amount of the basic EGR valve opening degree based on the intake air temperature measured by the intake air temperature sensor 96, and derives the final EGR opening degree (target EGR valve opening degree). In this case, since the target EGR valve opening degree is derived based on the intake air temperature measured by the intake air temperature sensor 96, it is not necessary to provide the EGR pressure sensor or the EGR temperature sensor, and thus it is possible to accurately control the amount of the EGR gas introduced into the intake passage with a simple configuration.

While the preferred example of the present invention has been described above with reference to accompanying drawings, the present invention is not limited to the example described above. It is apparent to those skilled in the art that various modifications and changes are to be conceived within the scope described in the appended claims, and it is understood that these modifications and changes are to fall within the technical scope of the present invention.

For instance, in the example described above, the correction opening degree deriving unit 104 derives the correction opening degree using the first temperature difference, the second temperature difference, and the virtual line. However, the present invention is not limited thereto. For instance, the correction opening degree deriving unit 104 may derive the correction opening degree while gradually changing the opening degree of the EGR valve 84 such that the first temperature difference approaches the second temperature difference. Specifically, the amount of change from the basic EGR valve opening degree of the EGR valve 84 when the first temperature difference and the second temperature difference are equal to each other is derived as the correction opening degree.

The present invention is applicable to the EGR control device.

The invention claimed is:
1. An EGR control device comprising:
a drive unit configured to vary an opening degree of an EGR valve;
a basic opening degree deriving unit configured to derive a basic EGR valve opening degree of the EGR valve on a basis of an operating condition of an engine;
a measurement unit configured to measure a temperature in the downstream side of a position of where EGR gas is recirculated in an intake passage;
a memory unit in which information acquired in advance is stored, the information indicating a relationship between the opening degree of the EGR valve and a temperature difference between a temperature when the EGR valve is set to the opening degree and a temperature when the EGR valve is set to a reference opening degree;
a correction opening degree deriving unit configured to derive a correction opening degree of the EGR valve with reference to the information, based on the temperature difference between the temperature when the EGR valve is set to the reference opening degree and the temperature when the EGR valve is set to the basic EGR valve opening degree; and
a control unit configured to control the drive unit such that the opening degree of the EGR valve becomes a target

EGR valve opening degree obtained by correcting the basic EGR valve opening degree with the correction opening degree.

2. The EGR control device according to claim 1, wherein the correction opening degree deriving unit derives the correction opening degree of the EGR valve based on a differential temperature difference which is a difference between a first temperature difference between the temperature when the EGR valve is set to the basic EGR valve opening degree and the temperature when the EGR valve is set to the reference opening degree, and a second temperature difference between the temperature when the EGR valve is set to the basic EGR valve opening degree and the temperature when the EGR valve is set to the reference opening degree on the basis of the information stored in the memory unit.

3. The EGR control device according to claim 2, wherein the information includes information indicating a slope of the temperature difference with respect to the opening degree of the EGR valve, in each of regions divided with the opening degree of the EGR valve, and the correction opening degree deriving unit is configured to specify a region including the basic EGR valve opening degree among the regions, derive a virtual line including a value of the first temperature difference with respect to the basic EGR valve opening degree and having a slope in a region including the basic EGR valve opening degree, and derive the correction opening degree on the basis of the virtual line and the differential temperature difference.

4. The EGR control device according to claim 1, wherein the correction opening degree deriving unit stores the derived correction opening degree in the memory unit.

5. The EGR control device according to claim 2, wherein the correction opening degree deriving unit stores the derived correction opening degree in the memory unit.

6. The EGR control device according to claim 3, wherein the correction opening degree deriving unit stores the derived correction opening degree in the memory unit.

* * * * *